United States Patent Office 3,541,545
Patented Nov. 17, 1970

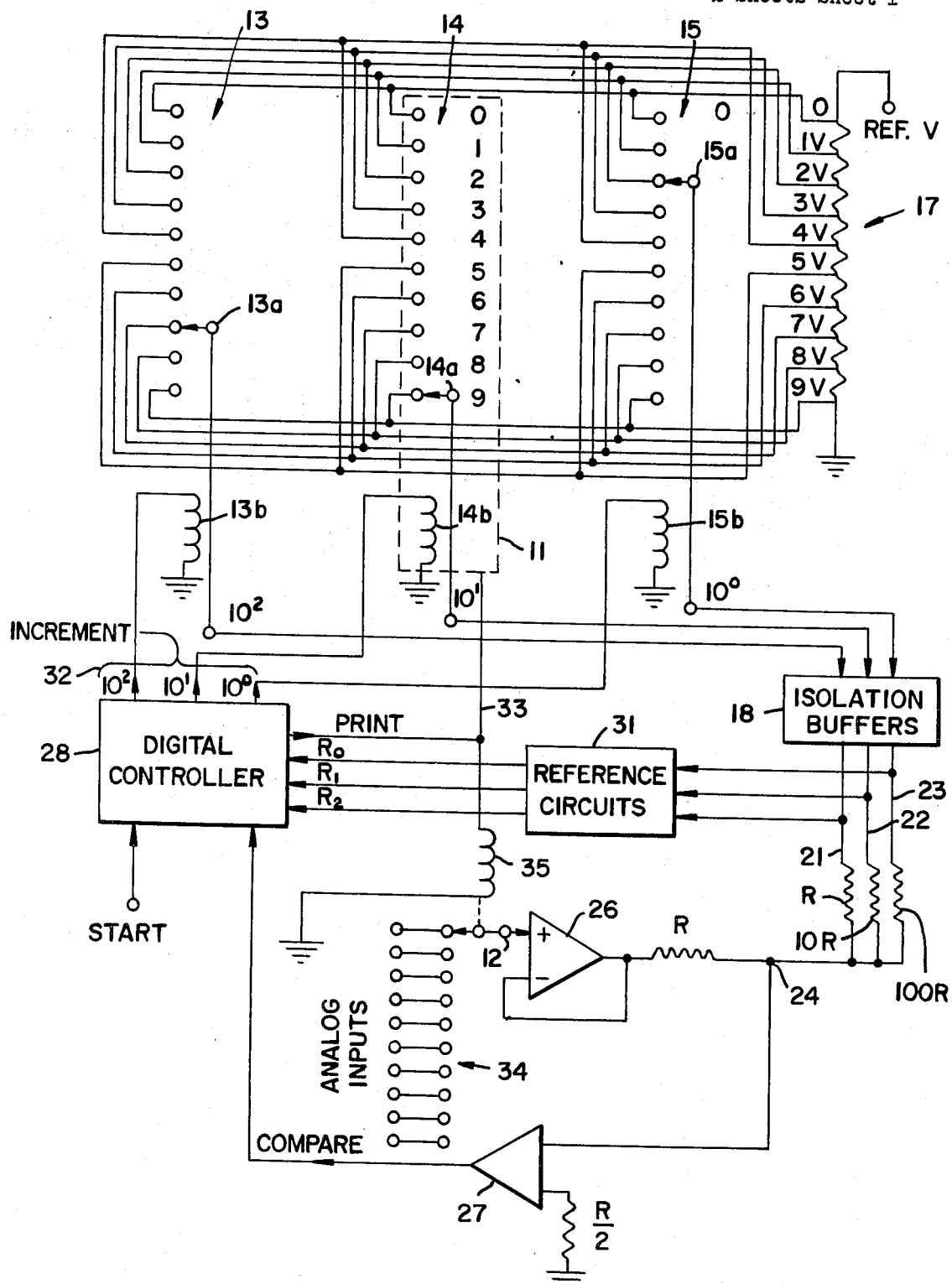
Nov. 17, 1970    H. O. CONDE ET AL    3,541,545
DIGITAL VOLTMETER WITH MECHANICAL COUNTING WHEELS
Filed Aug. 21, 1967    2 Sheets-Sheet 1
FIG_1
INVENTORS
HECTOR O. CONDE
PRENTISS W. JACKSON
BY
ATTORNEYS

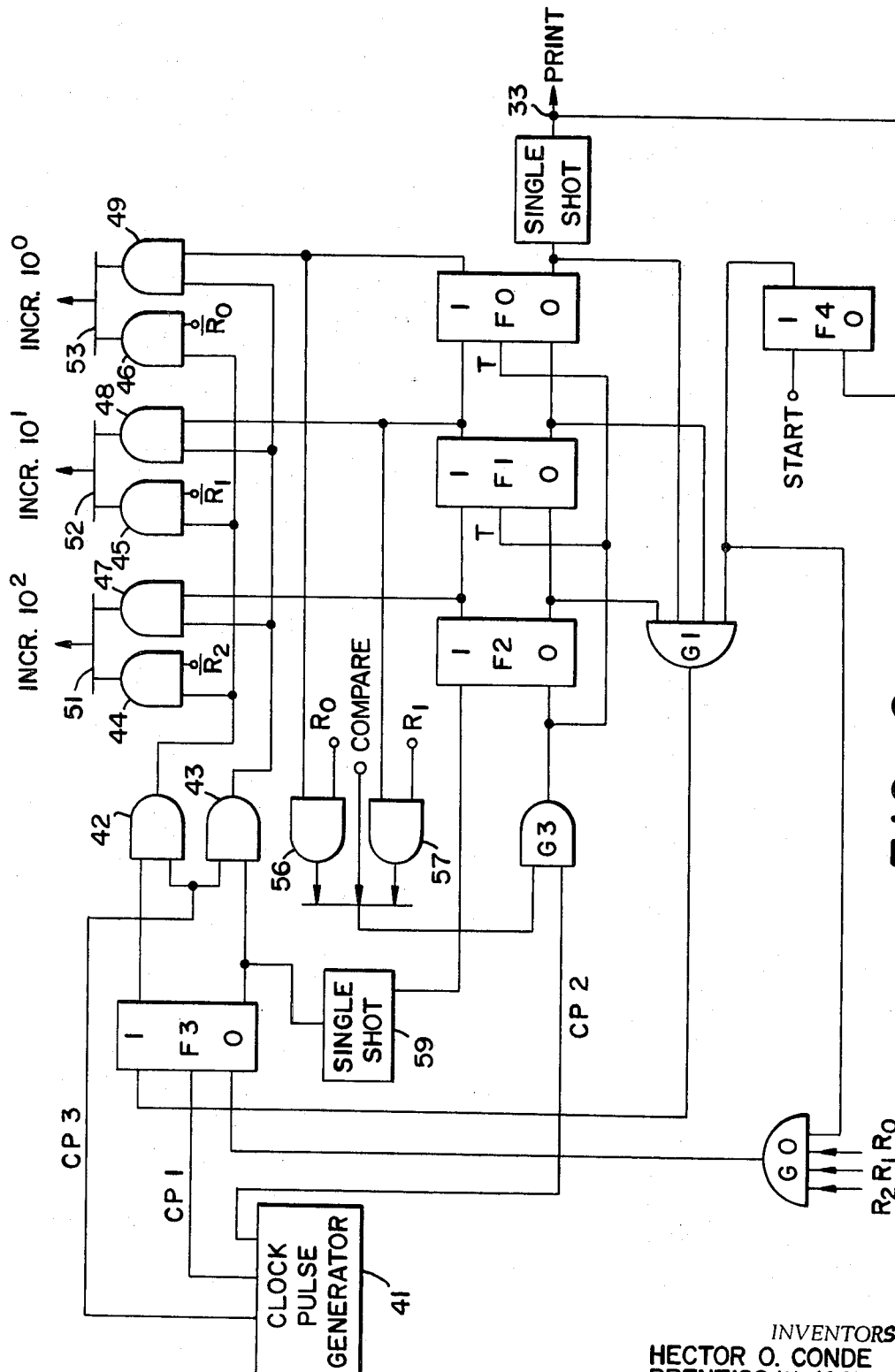
FIG_2

3,541,545
DIGITAL VOLTMETER WITH MECHANICAL COUNTING WHEELS
Hector O. Conde, San Pablo, and Prentiss W. Jackson, Oakland, Calif., assignors, by mesne assignments, to Berkeley Scientific Laboratories, Inc., Berkeley, Calif., a corporation of Texas
Filed Aug. 21, 1967, Ser. No. 661,955
Int. Cl. H03k 13/17
U.S. Cl. 340—347      6 Claims

ABSTRACT OF THE DISCLOSURE

A digital voltmeter having three mechanical decimal counting wheels which provide both visual and hard copy readout of the digital indication. A resistive ladder network is coupled to the 10 terminals of the counter wheels which are in parallel. Each of the counter wheels include a scanner for sensing the terminals and to provide an output voltage which is representative of the wheel position. The voltage outputs of the counter wheels are coupled to a digital to analog converter to convert the output voltage to analog information which is then compared with the analog input to incrementally advance the counters until the voltages are equal. Initially the counters are reset to "099" allowing the mechanical counters to effectively and efficiently count in only one direction.

---

The present invention is directed to a digital voltmeter with mechanical counting wheels and more specifically a voltmeter which has a printout capability.

Low cost digital voltmeters which are presently available are designed primarily for visual readout only. The addition of a hard copy output or even a remote readout feature is either not economically feasible or not available. High speed digital voltmeters, which are relatively expensive, allow additions, such as hard copy readout, only because of the relatively high cost of the basic instrument to its options. Thus, at the present time, there exists no flexible digital voltmeter which has the above characteristics.

It is a general object of the present invention to provide an improved digital voltmeter.

It is another object of the invention to provide a digital voltmeter having printed wheels which indicate both visually and by hard copy the voltmeter reading and, in addition, is relatively inexpensive.

Accordingly, there is provided an analog-to-digital device for converting the instantaneous amplitude of an analog input signal into a decimal digital number representative of the amplitude. A plurality of mechanical counter wheels is provided. Each is representative of a digit of the decimal number; one of the counter wheels represents the most significant digit and the other wheels represent less significant digits. Each of the counter wheels has ten stable positions corresponding to a unique decimal digit. A digital-to-analog converter senses the positions of the wheels and converts these positions to a voltage having a magnitude representative of the digital number represented by the wheel positions. This magnitude is compared to the analog input signal. Controller means responsive to the comparing means incrementally advance the counter wheels if the representative magnitude is less than the analog input signal. The controller means initiates the incrementing for the counter wheel representing the most significant digit until the representative magnitude is greater than the input signal and thereafter sequentially increments the other wheels in a similar manner. Means coupled to the controller means initially reference or set, before the incrementing begins, the most significant counter wheel to a decimal "zero" and each of the remaining counter wheels to decimal "nines."

These and other objects of the invention will become more clearly apparent from the following description.

DESCRIPTION OF THE DRAWINGS

Referring to the drawings:
FIG. 1 is a schematic diagram of an analog-to-digital device embodying the present invention; and
FIG. 2 is a more detailed schematic of a portion of FIG. 1.

Referring now to FIG. 1, the analog-to-digital converter device of the present invention includes from a broad standpoint three mechanical counter wheels. A representative one of the three is indicated in dashed outline 11. The counter wheels are capable of visually representing a decimal number which is the digital equivalent of the analog input signal 12. More specifically the mechanical counter wheels also include 10 position rotary switches indicated at 13, 14 and 15 where each switch position corresponds to a unique decimal digit. Each switch includes a moving contact 13a, 14a and 15a which, in the positions shown, represent the decimal number "792." Each rotary or moving contact 13a through 15a is actuated by coils 13b through 15b, respectively. These coils incrementally advance (hereafter termed "increment") the moving contacts. Rotary switch 13 is representative of the $10^2$ digit of the decimal number, switch 14 of $10^1$ and switch 15 of $10^0$. As thus far described, the three rotary switches are of standard construction and may be obtained, for example, from the California Electro-Scientific Corporation. These switches have both a visual indication of the rotary position of the switch and, at the same time, will print a permanent record on, for example, tape or paper. The dashed outline of rotary wheel 11 represents this printout capability.

The terminals of switches 13, 14 and 15 are tied together in parallel and are terminated on different tapoffs of a resistive ladder network 17 which is composed of a ladder of series resistors grounded on one end and having a reference voltage applied to the other. The ladder network divides the reference voltage into submultiples so that the line corresponding to the "zero" switch terminal has "zero" volts on it and the line corresponding to the "nine" switch terminal has "nine" volts on it. As will be explained in detail below, other voltages may be used as long as there is a linear correspondence.

Moving contacts 13a through 15a are coupled to isolation buffers 18 which serve to isolate any loads from the resistive ladder network 17 which is relatively sensitive to additional loads. The outputs of the three switch lines from isolation buffers 18 are coupled into an analog summer-comparator which includes the lines 21, 22 and 23, which correspond to moving rotary contacts 13a through 15a. Each of these lines includes a resistor which has a relative value determined by the significance of the digit which that rotary switch represents. More specifically, line 21 represents the $10^2$ decimal digit and has a resistor of the value R in the series circuit, line 22 represents the $10^1$ digit and has a resistor 10 times that value or 10R, and line 23 similarly represents the units or $10^0$ place and has a resistor of the value 100R. These lines and resistors are tied together at a node 24.

The comparator receives the analog input voltage signal at terminal 12 which is coupled to node 24 through a voltage-type follower 26 which has a relatively high input impedance and low output impedance. In series with the output of amplifier 26 is a series resistor also of the value R coupling the amplifier 26 to node 24.

An operational amplifier 27 is coupled to node 24 and serves to sum the four lines terminating at the node to generate a comparison voltage when the sum of the voltage on lines 21, 22 and 23 is greater in magnitude than the analog input voltage at terminal 12. If the sum is less, no comparison voltage is generated and a counter wheel is allowed to step to the next higher position as will be explained in detail in conjunction with FIG. 2. The input to operational amplifier 27 includes an input impedance resistor of the value $R/2$ which substantially matches the input impedance at node 24 to compensate for any current drift.

Thus, the amplified 27 may be thought of as having an output, labelled COMPARE which is bi-leveled and has a unit output when the comparison condition occurs; that is, when the internally generated voltage representative of the digital amount in rotary counter switches 13 through 15 is slightly greater than the analog input voltage at terminal 12. At all other times it may be thought of as being at "zero" level.

The COMPARE line is coupled into a digital controller 28 which will be discussed in detail in conjunction with FIG. 2. The outputs of isolation buffers 18 on lines 21, 22 and 23 are also coupled to reference circuits 31 which respond to certain voltage levels on these lines to produce a bi-level indication on lines $R_0$, $R_1$ and $R_2$ coupling the reference circuits 31 to digital controller 28. Subscripts of these input lines correspond to the superscripts of the digits represented by switches 13, 14 and 15. More specifically, line $R_0$ is set to a "one" level by the $10^0$ counter wheel 15 when this wheel displays the digit "nine," otherwise it is "zero." Line $R_1$ is set to "one" by the $10^1$ counter wheel 14 when this wheel displays the digit "nine," otherwise line $R_1$ is at a "zero" level. Finally, line $R_2$ is set to "one" by the $10^2$ counter wheel 13 when the wheel displays the digit "zero"; otherwise the line is at a "zero" level.

The specific reference circuits 31 necessary to perform the logical functions outlined above have not been disclosed in detail but are of standard design. For example, the circuitry associated with lines $R_0$ and $R_1$ would merely be a Zener diode in series with a transistor output having as its input lines 22 and 23; when the voltage approaches "nine" volts, the Zener diode conducts causing a unit output. Similarly, with relation to the output line $R_2$ of reference circuit 31, this circuit would merely entail the turning on of a transistor when a voltage approaching one volt is sensed. The output of reference circuits 31 have been simplified and may be of one polarity or the opposite depending on their specific application to the digital controller circuits 28 as will be described in detail below.

As stated above, the voltages tapped off from resistive ladder network 17 need not necessarily be identical to the numerical equivalents as long as they are some fixed fraction thereof. For example, ladder network 17 may divide five volts instead of ten as it does and such variation from the corresponding digit may be compensated by providing for an amplification of two in the isolation buffers 18 or by changing the values of the resistors in lines 21, 22 and 23.

Digital controller 28 has an additional input labelled START for initiating the counting process and has four outputs. Three of the outputs indicated at 32 are coupled to the incrementing coils 13b, 14b and 15b for incrementing the rotary counters. A print line 33 determines when the instantaneous reading of the digital voltmeter is to be printed.

Print line 33 is also coupled to an additional rotary switch 34 which provides for multiplexing a number of inputs to terminal 12. A ten position switch is shown but other numbers of positions may, of course, be used. Switch 34 is advanced by a pulse on print line 33. This occurs only when the previous reading is being recorded. More specifically, line 33 is coupled to stepping relay 35 of switch 34. Switch 34 may also include a printing wheel 11 for recording the analog input channel being monitored. In this case, a time delay must be inserted in the indexing line to allow printing before indexing the switch.

Referring now to FIG. 2, which is a detailed block diagram of digital controller 28, a clock pulse generator 41 produces pulse trains on lines CP1, CP2 and CP3 in that relative time sequence. The digital controller contains five flip-flops F0 through F4. Flip-flop F4 is coupled to the "START" line and is set to "one" whenever the digital voltmeter of the present invention is in operation. Flip-flops F0, F1 and F2 form a shift register and are sequentially set when incrementing the counter wheels 15, 14 and 13, respectively. Finally, F3 is set when the counter wheels are being initially reset before the actual count is started. The initial condition of the counter is with the counter wheel 13 at "zero" and counter wheels 14 and 15 at "nine."

The three pulse trains generated by clock pulse generator 41 serve the following functions. CP1 changes flip-flop F3 from the reset mode, where the counter wheels are initially set to "099," to the compare mode where they are counting and vice versa; CP2 shifts the status of flip-flops F2, F1 and F0 one place to the right to first increment the $10^2$ counter and then the $10^1$ and $10^0$ counters; finally, CP3 serves as the incrementing pulse for counter wheels 13, 14 and 15.

More specifically, clock pulse line CP3 is coupled to AND gates 42 and 43 which have as second inputs the set (1) and reset (0) outputs from flip-flop F3. An output on AND gates 42 and 43 occurs only when their two inputs are in time coincidence. The output of AND gate 42 is coupled to AND gates 44, 45 and 46 and the output of AND gate 43 to AND gates 47, 48 and 49. AND gates 47, 48 and 49 have as second inputs the set output terminals of flip-flops F2, F1 and F0. The outputs of these AND gates are coupled to OR gates 51, 52 and 53 which, in turn, serve as the incrementing inputs to coils 13b, 14b and 15b of the counter wheels.

The set output terminals of flip-flops F0 and F1 are also coupled, in addition to AND gates 48 and 49, to AND gates 56 and 57 which have as their other coincidence input the $R_0$ and $R_1$ lines, respectively. The output of these AND gates are coupled into an OR gate 58 having as a third input the COMPARE line (see FIG. 1); the output of OR gate 58 is coupled to AND gate G3. The other input of AND gate G3 is the CP2 line; its output is coupled to the reset input terminal "zero" of the F2 flip-flops and to trigger terminals T of the F1 and F0 flip-flops.

The "zero" level output of flip-flop F0 is coupled to a single shot multivibrator which has as an output the PRINT line 33. This is also coupled to the "zero" level input of flip-flop F4. A gate G1 has four inputs, one from the "one" output level of flip-flop F4 and three from the "zero" level output of flip-flops F0, F1 and F2. The output of gate G1 is coupled into the "one" level input of flip-flop F3.

G0 gate has as input lines $R_0$, $R_1$, $R_2$ from reference circuits 31 and also from a "one" level output of flip-flop F4. The output of the G0 gate is coupled into the "zero" level input of flip-flop F3.

Finally, as an input into the "one" level of flip-flop F2, there is a single shot multivibrator 59 which is actuated by the "zero" level output of flip-flop F3.

OPERATION

All flip-flops F0 through F4 in digital controller 28 are reset to "zero" during the idle condition of the counter. Referring first to the reset mode of the operation of the digital voltmeter of the present invention when the counter wheels are set to the "099" reference, a trigger on the START line to flip-flop F4 begins the cycle. Gate G1 receives a coincidence signal from its four inputs and sets bistable flip-flop F3 to the "one" level. As long as F3 is set to the "one" level, it is possible to increment the counter wheels by the incrementing count CP3 until each one is individually in its reset condition; that is, the visual reading is "099." More specifically, the counters will be incremented through AND gates 44, 45 and 46 until the inputs $R_0$, $R_1$ and $R_2$ from reference circuits 31 indicate that the proper initial count has been reached and gives a "one" level indication (or in this case the reverse of that since this is a reciprocal input) to end the reset mode incrementing. When the reading is "099," the GO gate responds to the $R_0$, $R_1$ and $R_2$ inputs along with the "one" level input from flip-flop F4 to reset flip-flop F3 to "zero." This resetting is accomplished by the clock pulse line CP1. This triggers single shot multivibrator 59 which sets flip-flop F2 to the "one" level. The counter is now ready to begin the actual counting of the analog input.

The setting of flip-flop F2 now allows only the incrementing line $10^2$ to function through AND gate 47 and OR gate 51. More specifically, line CP2 through AND gate G3 strobes, in essence, the condition or status of the COMPARE line through OR gate 58. When the compare condition occurs, where the internal count is higher than the analog input signal, the "true" condition occurs on the COMPARE line. At the coincidence of "COMPARE" with the clock signal on line CP2, AND gate G3 opens to shift the "one" bit in F2 to flip-flop F1.

However, when the "one" bit does shift to the F1 flip-flop, the comparison of the analog input voltage to the digital number in the counters does not take place immediately since the $10^1$ and $10^0$ counters are at the "nine" level. In other words, since the counters are at this already admittedly higher level than the analog input signal, absent other factors a compare signal would automatically be provided to shift the one bit to the next counter to give an erroneous reading. However, this cannot occur since the $10^1$ counter 14 is automatically incremented by CP3 which, as mentioned above, occurs immediately after the incrementing or shifting pulse CP2. Thus, by the time the shift pulse CP2 again occurs to coincide with any compare indication, the counter wheel now being incremented has been set to "zero" and now proceeds to count as with the previous counter wheel. The cycle finishes by incrementing the $10^0$ counter and shifting the one bit out of the F0 counter to the single shot multivibrator coupled to its "zero" level triggering the print line 33 and resetting F4 back to its initial or "zero" idle condition.

The additional inputs $R_0$ and $R_1$ to AND gates 56 and 57 are for the purpose of preventing unwanted counter advances. These may occur when the incrementing counter wheel in motion represents either the $10^1$ or $10^0$ digit and is in the "nine" position. The fluctuating inputs may cause the compare signal to be missed at this position. Thus, the incrementing is always stopped at the maximum "nine" to prevent a continuous unstable running condition.

Finally, the AND gate G1 is for the purpose of inhibiting flip-flop F3 from reverting to its "zero" condition until the reset mode of operation is to be utilized.

The operation of the present invention can also be described in conjunction with an algorithm consisting of the following steps:

(a) Reset counter wheels to 099.
(b) Is analog input greater than digital-to-analog converter output of isolator buffer 18? Yes: go to (c); No: go to (d).
(c) Increment $10^2$ digit; go to (b).
(d) Increment $10^1$ digit.
(e) Is analog input greater than digital-to-analog output? Yes: go to (d); No: go to (f).
(f) Increment $10^0$ digit.
(g) Is analog input greater than digital-to-analog output? Yes: go to (f); No: go to (h).
(h) STOP and PRINT.

An example of this technique with an analog source of the value of 322 is illustrated below with the steps related to the above algorithm in one column and the counter wheel positions in the other.

| Step: | Counter wheels |
|---|---|
| (a) | 099 |
| (b) | 099 |
| (c) | 199 |
| (b) | 199 |
| (c) | 299 |
| (b) | 299 |
| (c) | 399 |
| (b) | 399 |
| (d) | 309 |
| (e) | 309 |
| (d) | 319 |
| (e) | 319 |
| (d) | 329 |
| (e) | 329 |
| (f) | 320 |
| (g) | 320 |
| (f) | 321 |
| (g) | 321 |
| (f) | 322 |
| (g) | 322 |
| (h) | 322 |

From the above example the necessity for the initial setting of "099" is apparent. This automatically insures that no over count will occur in the first two digits (hundreds and tens). At the same time, a positive "compare" indication is achieved.

Thus, the improved analog-to-digital converter of the present invention provides, by the use of mechanical counting wheels, for both visual and hard copy printout of a digital indication of an analog voltage input in a simple and economical manner.

We claim:
1. An analog-to-digital device for converting the instantaneous amplitude of an analog input signal into a decimal digital number representative of said amplitude comprising a plurality of mechanical counter wheels each representative of a digital of said decimal number one of said counter wheels representing the most significant digit and the other wheels representing less significant digits, each of said counter wheels having ten stable positions each corresponding to a unique decimal digit, a digital-to-analog converter for sensing the positions of said wheels and converting these positions to a voltage having a magnitude representative of the digital number represented by said wheel positions; means for comparing such representative magnitude with said analog input signal, controller means responsive to said comparing means for independently incrementally advancing each of said counting wheels if said representative magnitude is less than said analog input signal, said controller means initiating said incrementing for said counter wheel representing said most significant digit until the representative magnitude is greater than said input signal and thereafter sequentially incrementing said other wheels in a similar manner, means coupled to said controller means for initially referencing, before said incrementing begins, said most significant counter wheel to a decimal "zero" and each of said remaining counter wheels to decimal "nines."

2. An analog-to-digital device as in claim 1 wherein said digital controller includes a shift register which successively allows each of said counter wheels to be incremented and a clock pulse generator for generating first, second and third pulse trains said first train of pulses causing a change from an initial mode where the counters are reset to "099" to the count mode, said second train of pulses being later in phase than said first train and shifting the status of the shift register from incrementing one counter to incrementing another in response to a comparison indication and said third pulse train being later in phase than said second train and incrementing said mechanical counter wheels, the later phase of such third incrementing pulse train allowing said counter wheels which represent less significant digits to be immediately incremented before the next occurrence of a compare pulse from said second pulse train, and, the later phase of said second train relative to said first train allowing a comparison to be made of the "zero" of the most significant digit counter wheel with said analog input signal without any immedaite incrementing by said third pulse train.

3. An analog-to-digital device as in claim 2 including means for rendering said first pulse train ineffective during said count mode.

4. An analog-to-digital device as in claim 1 including means coupled to said counter wheels for printing out the stable positions of said wheels at a predetermined time.

5. An analog-to-digital device as in claim 1 in which a common reference potentiometer provides reference voltages to all of said counter wheels for providing a voltage of said representative magnitude.

6. An analog-to-digital device as in claim 4 including a multiplexing switch for sequentially coupling a plurality of analog input signals to said comparing means, said switch being coupled to and indexed by said printing means.

References Cited

UNITED STATES PATENTS

| | | | |
|---|---|---|---|
| 2,497,961 | 2/1950 | Shaw | 340—347 |
| 2,775,754 | 12/1956 | Sink | 340—347 |
| 2,930,030 | 3/1960 | Hirose | 324—99 X |
| 3,034,715 | 5/1962 | Wagner | 324—99 X |
| 2,896,198 | 7/1959 | Bennett. | |

OTHER REFERENCES

Analog-Digital Conversion Handbook, Digital Equipment Corp., 1964, chapter 3, pp. 18 and 19.

MAYNARD R. WILBUR, Primary Examiner

C. D. MILLER, Assistant Examiner

U.S. Cl. X.R.

324—99